United States Patent
Kobayashi et al.

(10) Patent No.: US 11,835,111 B2
(45) Date of Patent: Dec. 5, 2023

(54) TRANSMISSION BELT

(71) Applicant: BANDO CHEMICAL INDUSTRIES, LTD., Kobe (JP)

(72) Inventors: Shogo Kobayashi, Kobe (JP); Ikuhito Doi, Kobe (JP); Hideyuki Kato, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 249 days.

(21) Appl. No.: 17/543,516

(22) Filed: Dec. 6, 2021

(65) Prior Publication Data
US 2022/0090649 A1 Mar. 24, 2022

Related U.S. Application Data

(63) Continuation of application No. PCT/JP2020/018376, filed on May 1, 2020.

(30) Foreign Application Priority Data

Jun. 7, 2019 (JP) .................................. 2019-107204

(51) Int. Cl.
*F16G 5/06* (2006.01)
*F16G 5/20* (2006.01)

(52) U.S. Cl.
CPC ..................... *F16G 5/06* (2013.01); *F16G 5/20* (2013.01)

(58) Field of Classification Search
CPC ..... F16G 5/06; F16G 1/08; F16G 1/06; F16G 5/04; C08L 23/16; C08L 21/00; C08L 2205/16

USPC .......................................... 474/260, 263, 264
See application file for complete search history.

(56) References Cited

U.S. PATENT DOCUMENTS

| | | | | |
|---|---|---|---|---|
| 4,125,493 A | * | 11/1978 | Posiviata | C08L 77/10 162/28 |
| 4,244,847 A | * | 1/1981 | Posiviata | C08L 77/10 523/205 |
| 7,254,934 B2 | * | 8/2007 | Wu | F16G 1/28 57/241 |
| 9,909,647 B2 | * | 3/2018 | Nonaka | C08J 3/203 |
| 10,746,257 B2 | | 8/2020 | Kobayashi et al. | |
| 2002/0042317 A1 | * | 4/2002 | South | F16G 5/20 474/263 |

(Continued)

FOREIGN PATENT DOCUMENTS

| CN | 107532681 A | 1/2018 |
|---|---|---|
| JP | 2011-064257 A | 3/2011 |

(Continued)

*Primary Examiner* — Henry Y Liu
(74) *Attorney, Agent, or Firm* — Maschoff Brennan

(57) ABSTRACT

A power transmission belt includes a belt body made of rubber and a cord embedded in the belt body. The belt body has a portion having the cord embedded therein, and the portion is made of a rubber composition having a storage normal modulus at 25° C. in a grain direction of 80 MPa or more and the ratio of the storage normal modulus at 25° C. in the grain direction to a storage normal modulus at 25° C. in a cross-grain direction of 1.20 or more to 2.50 or less. The rubber composition is arranged such that the grain direction corresponds to a belt length direction and the cross-grain direction corresponds to a belt width direction.

11 Claims, 3 Drawing Sheets

(56) References Cited

U.S. PATENT DOCUMENTS

| | | | | |
|---|---|---|---|---|
| 2011/0070989 A1* | 3/2011 | Duke | .................... | D02G 3/447 |
| | | | | 474/260 |
| 2013/0150488 A1* | 6/2013 | Feng | ...................... | C08L 21/00 |
| | | | | 524/9 |
| 2014/0066244 A1* | 3/2014 | Furukawa | ................ | F16G 5/20 |
| | | | | 474/263 |
| 2015/0218357 A1* | 8/2015 | Feng | ........................ | F16G 1/28 |
| | | | | 524/34 |
| 2015/0315372 A1* | 11/2015 | Feng | ...................... | C08L 23/16 |
| | | | | 524/13 |
| 2016/0208888 A1* | 7/2016 | Nonaka | .................... | F16G 1/08 |
| 2016/0208890 A1* | 7/2016 | Nonaka | .................. | C08J 3/203 |
| 2016/0251534 A1* | 9/2016 | Burlett | .................... | C01B 32/05 |
| | | | | 524/574 |
| 2016/0333963 A1* | 11/2016 | South | ........................ | F16G 5/06 |
| 2018/0045273 A1* | 2/2018 | Kobayashi | ................ | F16G 1/28 |
| 2018/0244906 A1* | 8/2018 | Feng | ...................... | C08L 23/16 |

FOREIGN PATENT DOCUMENTS

| | | |
|---|---|---|
| JP | 2016-205555 | 12/2016 |
| JP | 2016-211589 A | 12/2016 |
| JP | 6487037 B2 | 3/2019 |

\* cited by examiner

TRANSMISSION BELT

CROSS-REFERENCE TO RELATED APPLICATION

This is a continuation of International Application No. PCT/JP2020/18376 filed on May 1, 2020, which claims priority to Japanese Patent Application No. 2019-107204 filed on Jun. 7, 2019. The entire disclosures of these applications are incorporated by reference herein.

BACKGROUND

The present invention relates to a power transmission belt.

It has been known that a rubber composition forming a power transmission belt contains cellulose-based fine fibers. For example, Patent Document 1: Japanese Patent No. 6487037 discloses that an adhesive rubber layer, in which a cord is embedded, of a belt body of a power transmission belt is made of a rubber composition containing cellulose-based fine fibers.

SUMMARY

The present invention is directed to a power transmission belt including a belt body made of rubber and a cord embedded in the belt body. The belt body has a portion having a cord embedded therein and made of a rubber composition having a storage normal modulus at 25° C. in a grain direction of 80 MPa or more and a ratio of the storage normal modulus at 25° C. in the grain direction to a storage normal modulus at 25° C. in a cross-grain direction of 1.20 or more to 2.50 or less.

DESCRIPTION OF EMBODIMENT

An embodiment will be described in detail below.

Figure 1A:
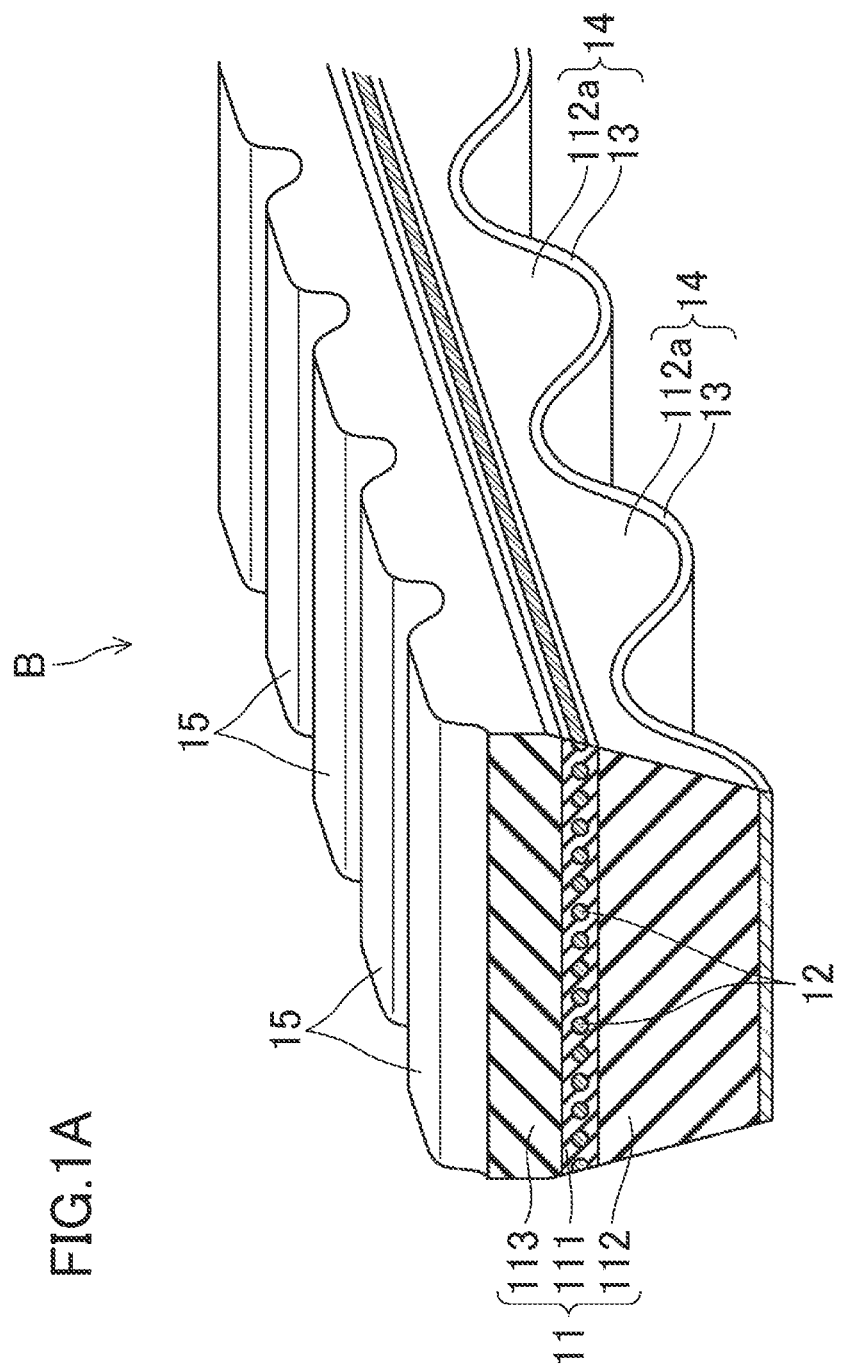
FIG. 1A is a perspective view of a piece of a double-cogged V-belt of an embodiment.
Figure 1B:
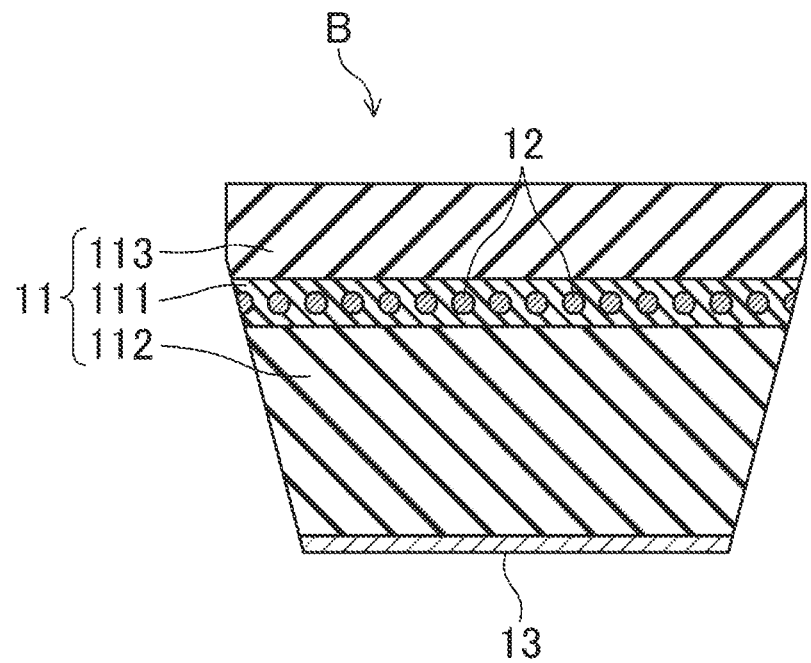
FIG. 1B is a cross-sectional view of the double-cogged V-belt of the embodiment in a belt width direction.
Figure 1C:
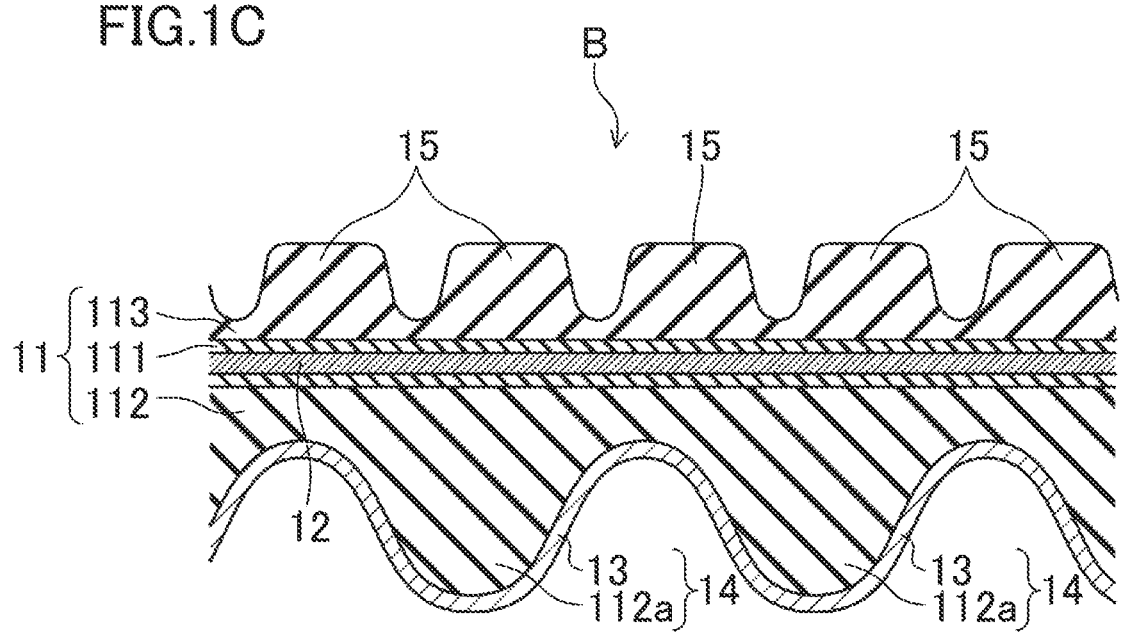
FIG. 1C is a cross-sectional view of the double-cogged V-belt of the embodiment in a belt length direction.

FIGS. 1A to 1C illustrate a double-cogged V-belt B (a power transmission belt) of an embodiment. The double-cogged V-belt B of the embodiment is, for example, a raw edge V-belt used as a power transmission member for transmission in a transmission of a two-wheeled vehicle. The double-cogged V-belt B of the embodiment has a length of 500 mm or more to 1400 mm or less, a maximum width of 15 mm or more to 40 mm or less, and a maximum thickness of 7.0 mm or more to 18.0 mm or less, for example.

The double-cogged V-belt B of the embodiment includes an endless belt body 11 made of rubber. The belt body 11 is formed into a shape whose cross-sectional shape along a belt width direction is a combined and stacked shape of an isosceles trapezoid on an inner side of the belt and a horizontal rectangle on an outer side of the belt. Inclined surfaces of the belt body 11 on both sides thereof are formed as pulley contact surfaces. The belt body 11 includes three layers of an adhesive rubber layer 111 at an intermediate portion in a belt thickness direction, a compressed rubber layer 112 constituting the inner side of the belt, and a stretch rubber layer 113 constituting the outer side of the belt.

The double-cogged V-belt B of the embodiment includes a cord 12 embedded in an intermediate portion of the adhesive rubber layer 111 in the belt thickness direction. The cord 12 is provided to extend in a circumferential direction to form a helical pattern with pitches in the belt width direction. The double-cogged V-belt B of the embodiment includes cover fabric 13 provided to cover the surface of the compressed rubber layer 112 constituting the inner side of the belt. The compressed rubber layer 112 includes, on its inner side, lower cog forming portions 112a at a constant pitch, the cross-sectional shape of each lower cog forming portion 112a along a belt length direction being a sine curve shape. The lower cog forming portions 112a are covered with the cover fabric 13 to form lower cogs 14. On the other hand, the stretch rubber layer 113 includes, on its outer side, upper cogs 15 at a constant pitch, the cross-sectional shape of each upper cog 15 along the belt length direction being a rectangular shape.

The adhesive rubber layer 111 forms a portion of the belt body 10 in which the cord 12 is embedded. The adhesive rubber layer 111 is made of a rubber composition A. The rubber composition A is arranged such that a grain direction thereof corresponds to the belt length direction and a cross-grain direction thereof corresponds to the belt width direction.

The storage normal modulus E' of the rubber composition A forming the adhesive rubber layer 111 at 25° C. in the grain direction is 80 MPa or more, suitably 100 MPa or more, more suitably 120 MPa or more, and suitably 150 MPa or less in terms of obtaining excellent durability. The storage normal modulus E' of the rubber composition A at 25° C. in the cross-grain direction is suitably 50 MPa or more, more suitably 60 MPa or more, much more suitably 80 MPa or more, and suitably 100 MPa or less in terms of obtaining excellent durability. The storage normal modulus E' as described herein is measured in accordance with JIS K6394: 2007.

The ratio (the storage normal modulus E' at 25° C. in the grain direction/storage normal modulus E' at 25° C. in the cross-grain direction) of the storage normal modulus E' of the rubber composition A at 25° C. in the grain direction to the storage normal modulus E' of the rubber composition A at 25° C. in the cross-grain direction is 1.20 or more to 2.50 or less, suitably 1.30 or more to 2.00 or less, more suitably 1.35 or more to 1.60 or less, much more suitably 1.45 or more to 1.50 or less in terms of obtaining excellent durability.

According to the double-cogged V-belt B of the embodiment, the storage normal modulus of the rubber composition, which forms the adhesive rubber layer 111 forming the portion of the belt body 11 in which the cord 12 is embedded, at 25° C. in the grain direction is 80 MPa or more, which is high, and the ratio of the storage normal modulus at 25° C. in the grain direction to the storage normal modulus at 25° C. in the cross-grain direction is 1.20 or more to 2.50 or less. With this configuration, excellent durability can be obtained. The reason for this is assumed to be as follows. The storage normal modulus of the adhesive rubber layer 111 in the grain direction is slightly higher than the storage normal modulus E' in the cross-grain direction; therefore, durability against a shear load generated at an interface between the adhesive rubber layer 111 and the cord 12 is enhanced. On the other hand, the storage normal modulus E' in the cross-grain direction is lower; therefore, a difference in the elastic modulus in the belt width direction between the adhesive rubber layer 111 and the compressed rubber layer 112 is lessened.

The rubber composition A forming the adhesive rubber layer 111 is a crosslinked rubber composition obtained by heating and pressurizing an uncrosslinked rubber composition to be crosslinked. The uncrosslinked rubber composition is obtained by kneading a blend of the rubber component and various compound ingredients.

Examples of the rubber component include: chloroprene rubber (CR); ethylene-α-olefin elastomer such as ethylene propylene copolymer (EPR), ethylene-propylene-diene terpolymer (EPDM), ethylene-octene copolymer, and ethylene-butene copolymer; chlorosulfonated polyethylene rubber (CSM); and hydrogenated acrylonitrile rubber (H-NBR), for example. The rubber component is suitably one type of these rubbers or a rubber blend of two or more types of these rubbers, more suitably contains chloroprene rubber (CR), much more suitably contains sulfur-modified chloroprene rubber (sulfur-modified CR) in terms of obtaining excellent durability.

The rubber composition A suitably contains cellulose-based fine fibers dispersed in the rubber component in terms of obtaining a high elasticity with a moderate anisotropy and excellent durability. The cellulose-based fine fibers are a fiber material derived from cellulose fine fibers made of a cytoskeleton component of a plant cell wall. The cytoskeleton component is obtained by untangling plant fibers. Examples of raw plants for the cellulose-based fine fibers include wood, bamboo, rice plants (rice straw), potato, sugarcane (bagasse), water plants, and seaweed. Among these raw plants, wood is suitable.

The cellulose-based fine fibers include cellulose fine fibers themselves and hydrophobized cellulose fine fibers obtained by hydrophobing the cellulose fine fibers. The cellulose-based fine fibers suitably contain one or both of these fibers.

The cellulose-based fine fibers include those manufactured by mechanically-defibrating means and having a high aspect ratio and those manufactured by chemically-defibrating means and having a needle crystal. The cellulose-based fine fibers suitably contain one or both of these fibers, more suitably contain cellulose-based fine fibers manufactured by mechanically-defibrating means in terms of obtaining excellent durability.

The average fiber diameter of the cellulose-based fine fibers is, for example, 10 nm or more to 1000 nm or less. The average fiber length of the cellulose-based fine fibers is, for example, 0.1 µm or more to 1000 µm or less. The content of the cellulose-based fine fibers in the rubber composition A is suitably 1 part by mass or more to 20 parts by mass or less, more suitably 1.5 parts by mass or more to 10 parts by mass or less, much more suitably 2 parts by mass or more to 5 parts by mass or less, relative to 100 parts by mass of the rubber component, in terms of obtaining excellent durability.

The rubber composition A may contain carbon black dispersed in the rubber component. Examples of the carbon black include: channel black; furnace black such as SAF, ISAF, N-339, HAF, N-351, MAF, FEF, SRF, GPF, ECF, and N-234; thermal black such as FT and MT; and acetylene black. The carbon black suitably contains one type or two or more types of these substances, more suitably contains carbon black having an arithmetic average particle diameter of 50 µm or less, much more suitably contains FEF, in terms of obtaining excellent durability.

The content of the carbon black in the rubber composition A is suitably 30 parts by mass or more to 80 parts by mass or less, more suitably 50 parts by mass or more to 60 parts by mass or less relative to 100 parts by mass of the rubber component, in terms of obtaining high elasticity while reducing heat generation by reducing an energy loss upon deformation and obtaining excellent durability. When the rubber composition A contains both of the cellulose-based fine fibers and the carbon black, the content of the carbon black in the rubber composition A is suitably greater than the content of the cellulose-based fine fibers in terms of the same. The ratio (the content of the carbon black/the content of the cellulose-based fine fibers) of the content of the carbon black to the content of the cellulose-based fine fibers in the rubber composition A is suitably 10 or more to 30 or less, more suitably 15 or more to 25 or less, much more suitably 17 or more to 20 or less in terms of the same.

The rubber composition A may contain, as other rubber compound ingredients, a plasticizer, a processing aid, an antioxidant, a crosslinking agent, a co-crosslinking agent, a vulcanization accelerator, a vulcanization accelerator aid, and the like. The rubber composition A suitably contains substantially no short fibers with a fiber diameter of 10 µm or more. The phrase "contain substantially no short fibers" as used herein means that no short fibers are contained at all or the content of the short fibers is 3 parts by mass or less relative to 100 parts by mass of the rubber component.

The compressed rubber layer 112 and the stretch rubber layer 113 are, as in the adhesive rubber layer 111, also made of crosslinked rubber compositions each of which is obtained by heating and pressurizing an uncrosslinked rubber composition obtained by kneading a blend of a rubber component and various compound ingredients. The rubber composition forming the compressed rubber layer 112 and/or the stretch rubber layer 113 may be the same as the rubber composition A forming the adhesive rubber layer 111.

The cord 12 is made of a twisted yarn of fibers, such as polyester fibers, polyethylene naphthalate fibers, aramid fibers, and vinylon fibers. The cord 12 is suitably subjected to adhesion treatment such as RFL treatment for providing adhesion to the adhesive rubber layer 111 of the belt body 11.

The cover fabric 13 is made of woven fabric, knitted fabric, or unwoven fabric, made of yarns of cotton, polyamide fibers, polyester fibers, or aramid fibers, for example. The cover fabric 13 is suitably subjected to adhesion treatment such as RFL treatment for providing adhesion to the compressed rubber layer 112 of the belt body 11.

The double-cogged V-belt B of the embodiment can be manufactured by a known method which has been commonly used. Note that the uncrosslinked rubber sheet before being crosslinked of the rubber composition A forming the adhesive rubber layer 111 is arranged such that the grain direction thereof corresponds to the belt length direction and the cross-grain direction thereof corresponds to the belt width direction. Normally, in a case where the adhesive rubber layer is made of a rubber composition with a high anisotropy, the uncrosslinked rubber sheet before being crosslinked is arranged such that the grain direction thereof corresponds to the belt width direction and the cross-grain direction thereof corresponds to the belt length direction, before crosslinked so that the adhesive rubber layer has a higher elasticity in the belt width direction, to enhance lateral pressure resistance. On the other hand, in manufacturing of the double-cogged V-belt B of the embodiment, the uncrosslinked rubber sheet of the rubber composition A is arranged in reverse.

The present embodiment has been described above for the double-cogged V-belt B, but the present disclosure is not

EXAMPLES (Double-Cogged V-Belt)

Double-cogged V-belts of Examples 1 to 3 and Comparative Examples 1 to 3 below were produced. Compositions of each rubber composition forming an adhesive rubber layer are also shown in Table 1.

Example 1

Kraft pulp was added to water such that the content of the kraft pulp reached 1% by mass, and the resultant mixture was preliminarily mixed with a stirrer and then charged into a micronizing device (Star Burst manufactured by Sugino Machine Limited). Subsequently, a process of pressurizing the mixture up to the 150 MPa and then causing the mixture to collide with a ceramic ball was repeated a total of eight times. In this manner, an aqueous dispersion of cellulose-based fine fibers manufactured by mechanically-defibrating means was prepared.

The aqueous dispersion of the cellulose-based fine fibers was mixed with sulfur-modified CR latex such that the content of the cellulose-based fine fibers reached 3 parts by mass relative to 100 parts by mass of sulfur-modified CR of a rubber component of the sulfur-modified CR latex, and the resultant mixture was air-dried and solidified.

A solid CR-cellulose-based fine fiber composite was charged into a rubber kneader and kneaded. Then, 45 parts by mass of carbon black (an FEF arithmetic average particle diameter: 43 μm), 5 parts by mass of a plasticizer (DOS), 1 part by mass of a processing aid (stearic acid), 4 parts by mass of an antioxidant, 6 parts by mass of a co-crosslinking agent (bismaleimide), and 5 parts by mass of magnesium oxide relative to 100 parts by mass of the sulfur-modified CR of the rubber component were further charged and kneaded. Thereafter, 5 parts by mass of zinc oxide were further charged and kneaded. In this manner, an uncrosslinked rubber composition was prepared, and an uncrosslinked rubber sheet 1 was produced through a calender apparatus.

This uncrosslinked rubber sheet 1 was heated and pressurized, thereby obtaining a crosslinked sheet-shaped rubber composition. The crosslinked sheet-shaped rubber composition had a storage normal modulus E' at 25° C. in the grain direction measured in accordance with JIS K6394: 2007 of 80 MPa. The storage normal modulus E' at 25° C. in the cross-grain direction was 54 MPa. The ratio of the storage normal modulus E' in the grain direction to the storage normal modulus E' in the cross-grain direction was 1.48.

A double-cogged V-belt having the same configuration as the above-described embodiment was produced, in which an adhesive rubber layer was made of a rubber composition obtained by crosslinking the uncrosslinked rubber sheet 1 arranged such that the grain direction corresponds to the belt length direction and the cross-grain direction corresponds to the belt width direction. This double-cogged V-belt was used in Example 1.

A compressed rubber layer and a stretch rubber layer were made of rubber compositions each of which is obtained by crosslinking an uncrosslinked rubber sheet which contains a blend of sulfur-modified CR of a rubber component and aramid short fibers and is arranged such that the grain direction corresponds to the belt width direction and the cross-grain direction corresponds to the belt length direction. As a cord, a twisted yarn of para-aramid fibers subjected to RFL treatment and rubber cement treatment was used. As cover fabric, woven fabric of polyester fibers which had been subjected to RFL treatment and rubber cement treatment was used. The belt size was 1200 mm in length, 33 mm in maximum width, and 16 mm in maximum thickness.

Example 2

An uncrosslinked rubber sheet 2 having the same configuration as the uncrosslinked rubber sheet 1 of Example 1 was produced, except that the content of carbon black was 50 parts by mass relative to 100 parts by mass of sulfur-modified CR of a rubber component.

This uncrosslinked rubber sheet 2 was heated and pressurized, thereby obtaining a crosslinked sheet-shaped rubber composition. The crosslinked sheet-shaped rubber composition had a storage normal modulus E' at 25° C. in the grain direction of 102 MPa. The storage normal modulus E' at 25° C. in the cross-grain direction was 73 MPa. The ratio of the storage normal modulus E' in the grain direction to the storage normal modulus E' in the cross-grain direction was 1.40.

A double-cogged V-belt having the same configuration as Example 1 was produced, except that the uncrosslinked rubber sheet 2 was used instead of the uncrosslinked rubber sheet 1. This double-cogged V-belt was used in Example 2.

Example 3

An uncrosslinked rubber sheet 3 having the same configuration as the uncrosslinked rubber sheet 1 of Example 1 was produced, except that the content of carbon black was 55 parts by mass relative to 100 parts by mass of sulfur-modified CR of a rubber component.

This uncrosslinked rubber sheet 3 was heated and pressurized, thereby obtaining a crosslinked sheet-shaped rubber composition. The crosslinked sheet-shaped rubber composition had a storage normal modulus E' at 25° C. in the grain direction of 128 MPa. The storage normal modulus E' at 25° C. in the cross-grain direction was 86 MPa. The ratio of the storage normal modulus E' in the grain direction to the storage normal modulus E' in the cross-grain direction was 1.49.

A double-cogged V-belt having the same configuration as Example 1 was produced, except that the uncrosslinked rubber sheet 3 was used instead of the uncrosslinked rubber sheet 1. This double-cogged V-belt was used in Example 3.

Comparative Example 1

An uncrosslinked rubber sheet 4 having the same configuration as the uncrosslinked rubber sheet 1 of Example 1 was produced, except that sulfur-modified CR obtained by air-drying and solidifying sulfur-modified CR latex was used instead of a CR-cellulose-based fine fiber composite.

This uncrosslinked rubber sheet 4 was heated and pressurized, thereby obtaining a crosslinked sheet-shaped rubber composition. The crosslinked sheet-shaped rubber composition had a storage normal modulus E' at 25° C. in the grain direction of 63 MPa. The storage normal modulus E' at 25° C. in the cross-grain direction was 56 MPa. The ratio of the storage normal modulus E' in the grain direction to the storage normal modulus E' in the cross-grain direction was 1.13.

A double-cogged V-belt having the same configuration as Example 1 was produced, except that the uncrosslinked rubber sheet 4 was used instead of the uncrosslinked rubber sheet 1. This double-cogged V-belt was used in Comparative Example 1.

Comparative Example 2

An uncrosslinked rubber sheet 5 having the same configuration as the uncrosslinked rubber sheet 1 of Example 1 was produced, except that sulfur-modified CR obtained by air-drying and solidifying sulfur-modified CR latex was used instead of a CR-cellulose-based fine fiber composite and the content of carbon black was 60 parts by mass relative to 100 parts by mass of the sulfur-modified CR of a rubber component.

This uncrosslinked rubber sheet 5 was heated and pressurized, thereby obtaining a crosslinked sheet-shaped rubber composition. The crosslinked sheet-shaped rubber composition had a storage normal modulus E' at 25° C. in the grain direction of 91 MPa. The storage normal modulus E' at 25° C. in the cross-grain direction was 79 MPa. The ratio of the storage normal modulus E' in the grain direction to the storage normal modulus E' in the cross-grain direction was 1.15.

A double-cogged V-belt having the same configuration as Example 1 was produced, except that the uncrosslinked rubber sheet 5 was used instead of the uncrosslinked rubber sheet 1. This double-cogged V-belt was used in Comparative Example 2.

Comparative Example 3

An uncrosslinked rubber sheet 6 having the same configuration as the uncrosslinked rubber sheet 1 of Example 1 was produced, except that sulfur-modified CR obtained by air-drying and solidifying sulfur-modified CR latex was used instead of a CR-cellulose-based fine fiber composite and 1 part by mass of para-aramid short fibers which had a fiber length of 1 mm and had been subjected to RFL treatment was blended relative to 100 parts by mass of the sulfur-modified CR of a rubber component.

This uncrosslinked rubber sheet 6 was heated and pressurized, thereby obtaining a crosslinked sheet-shaped rubber composition. The crosslinked sheet-shaped rubber composition had a storage normal modulus E' at 25° C. in the grain direction of 155 MPa. The storage normal modulus E' at 25° C. in the cross-grain direction was 60 MPa. The ratio of the storage normal modulus E' in the grain direction to the storage normal modulus E' in the cross-grain direction was 2.58.

A double-cogged V-belt having the same configuration as Example 1 was produced, except that the uncrosslinked rubber sheet 6 was used instead of the uncrosslinked rubber sheet 1. This double-cogged V-belt was used in Comparative Example 3.

TABLE 1

| | | Uncrosslinked Rubber Sheets | | | | | |
|---|---|---|---|---|---|---|---|
| | | 1 | 2 | 3 | 4 | 5 | 6 |
| Rubber Ingredients Parts by Mass | Rubber Component (Sulfur-Modified CR) | 100 | 100 | 100 | 100 | 100 | 100 |
| | Cellulose-Based Fine Fibers X | 3 | 3 | 3 | 0 | 0 | 0 |
| | Carbon Black (FEF) Y | 45 | 50 | 55 | 50 | 60 | 45 |
| | Plasticizer (DOS) | 5 | 5 | 5 | 5 | 5 | 5 |
| | Processing Aid (Stearic Acid) | 1 | 1 | 1 | 1 | 1 | 1 |
| | Antioxidant | 4 | 4 | 4 | 4 | 4 | 4 |
| | Co-Crosslinking Agent (Bismaleimide) | 6 | 6 | 6 | 6 | 6 | 6 |
| | Magnesium Oxide | 5 | 5 | 5 | 5 | 5 | 5 |
| | Zinc Oxide | 5 | 5 | 5 | 5 | 5 | 5 |
| | Para-Aramid Short Fibers | 0 | 0 | 0 | 0 | 0 | 1 |
| | Y/X | 15.0 | 16.7 | 18.3 | — | — | — |
| | Storage Normal Modulus E' in Grain Direction MPa | 80 | 102 | 128 | 63 | 91 | 155 |
| | Storage Normal Modulus E' in Cross-Grain Direction MPa | 54 | 73 | 86 | 56 | 79 | 60 |
| | E' in Grain Direction/E' in Cross-Grain Direction | 1.48 | 1.40 | 1.49 | 1.13 | 1.15 | 2.58 |

(Test Method)

Figure 2:
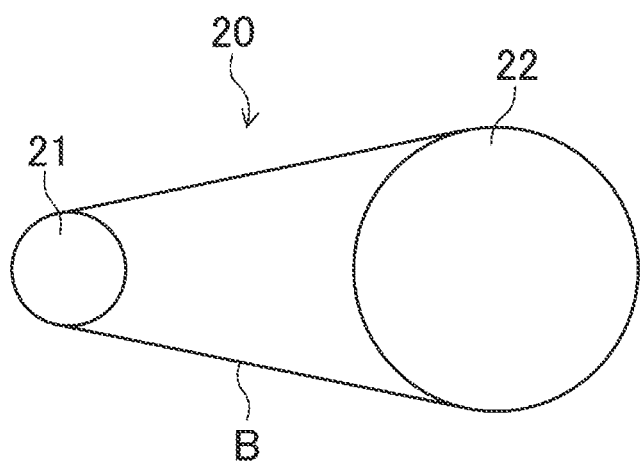
FIG. 2 is a view of the layout of pulleys of a belt running tester.

FIG. 2 illustrates the layout of pulleys of a belt running tester 20.

The belt running tester 20 includes a drive pulley 21 and a driven pulley 22 provided with a space in a right-left direction. The drive pulley 21 has a pulley diameter of 80 mm, and has a V-groove at the outer periphery thereof. The driven pulley 22 has a pulley diameter of 200 mm, and has a V-groove at the outer periphery thereof.

Each of the double-cogged V-belts B of Examples 1 to 3 and Comparative Examples 1 to 3 was wrapped around the drive pulley 21 and the driven pulley 22 so as to be fitted in V-grooves of the drive pulley 21 and the driven pulley 22. Then, under an ambient temperature of 80° C., the drive pulley 21 was rotated at the number of revolutions of 6000 rpm, and in this state, a rotation torque load was applied to the driven pulley 22 such that the input torque of the drive pulley 21 reached 80 N·m, and the belt was run until the belt was broken. Then, a running time until the belt was broken after the start of belt running was measured as a durability life.

(Test Results)

The test results are shown in Table 2. As can be seen from Table 2, the durability in Examples 1 to 3 was significantly higher than that in Comparative Examples 1 to 3. The double-cogged V-belts B of Comparative Example 3 was considered to be damaged due to the short fibers contained therein.

TABLE 2

|  | Examples | | | Comparative Examples | | |
| --- | --- | --- | --- | --- | --- | --- |
|  | 1 | 2 | 3 | 1 | 2 | 3 |
| Adhesive Rubber Layer | Rubber 1 | Rubber 2 | Rubber 3 | Rubber 4 | Rubber 5 | Rubber 6 |
| Durability Life hours | 21.2 | 28.1 | 36.4 | 7.9 | 10.8 | 0.8 |

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A power transmission belt comprising:
a belt body made of rubber; and a cord embedded in the belt body,
the belt body having a portion that has the cord embedded therein and that is made of a rubber composition having a storage normal modulus at 25° C. in a grain direction of 80 MPa or more and a ratio of the storage normal modulus at 25° C. in the grain direction to a storage normal modulus at 25° C. in a cross-grain direction of 1.20 or more to 2.50 or less, and
the rubber composition being arranged such that the grain direction corresponds to a belt length direction and the cross-grain direction corresponds to a belt width direction.

2. The power transmission belt of claim 1, wherein
a rubber component of the rubber composition includes chloroprene rubber.

3. The power transmission belt of claim 1, wherein
the rubber composition contains cellulose-based fine fibers.

4. The power transmission belt of claim 3, wherein
the cellulose-based fine fibers include cellulose-based fine fibers formed by mechanically-defibrating means.

5. The power transmission belt of claim 3, wherein
a content of the cellulose-based fine fibers in the rubber composition is 1 part by mass or more to 20 parts by mass or less relative to 100 parts by mass of the rubber component.

6. The power transmission belt of claim 3, wherein
the rubber composition contains carbon black, and the carbon black includes FEF.

7. The power transmission belt of claim 6, wherein
a content of the carbon black in the rubber composition is 30 parts by mass or more to 80 parts by mass or less relative to 100 parts by mass of the rubber component.

8. The power transmission belt of claim 6, wherein
the content of the carbon black in the rubber composition is greater than the content of the cellulose-based fine fibers.

9. The power transmission belt of claim 8, wherein
a ratio of the content of the carbon black to the content of the cellulose-based fine fibers in the rubber composition is 10 or more to 30 or less.

10. The power transmission belt of claim 1, wherein
the rubber composition contains substantially no short fibers.

11. The power transmission belt of claim 1, wherein
the rubber composition has the storage normal modulus E' at 25° C. in the cross-grain direction of 50 MPa or more to 100 MPa or less.

* * * * *